United States Patent [19]

Tamaru et al.

[11] Patent Number: 4,841,093

[45] Date of Patent: Jun. 20, 1989

[54] AROMATIC DICARBOXYLIC ACID DIALLYL ESTER DERIVATIVE, PREPOLYMER DERIVED FROM THE DERIVATIVE AND CURABLE RESIN COMPOSITION CONTAINING THE DERIVATIVE

[75] Inventors: Sinji Tamaru, Suita; Motonobu Kubo, Toyonaka, both of Japan

[73] Assignee: Daikin Industries, Ltd., Osaka, Japan

[21] Appl. No.: 109,413

[22] Filed: Oct. 19, 1987

[30] Foreign Application Priority Data

Oct. 22, 1986 [JP] Japan ................ 61-252439
Dec. 23, 1986 [JP] Japan ................ 61-314653
Dec. 24, 1986 [JP] Japan ................ 61-314517
Dec. 24, 1986 [JP] Japan ................ 61-314518

[51] Int. Cl.$^4$ .............................................. C07C 69/76
[52] U.S. Cl. .................................. 560/65; 560/67; 560/95
[58] Field of Search ................. 560/65, 67, 61, 95

[56] References Cited

U.S. PATENT DOCUMENTS 2,249,768 7/1941 Kropa .................... 560/95
3,120,559 2/1964 Hetzel ................... 560/95

FOREIGN PATENT DOCUMENTS 59-031725 2/1984 Japan ................ 560/65
61-024547 2/1986 Japan ................ 560/65

Primary Examiner—Patricia Short
Attorney, Agent, or Firm—Armstrong, Nikaido, Marmelstein, Kubovcik & Murray

[57] ABSTRACT

A diallyl aromatic dicarboxylate derivative of the formula

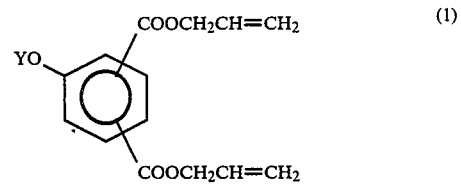

wherein Y is hydrogen atom or perfluoroalkenyl group having 6 to 14 carbon atoms, is a novel compound. The compound (1) is a starting material for a prepolymer containing a repeating unit derived from diallyl aromatic fluorine-containing dicarboxylate and represented by the formula

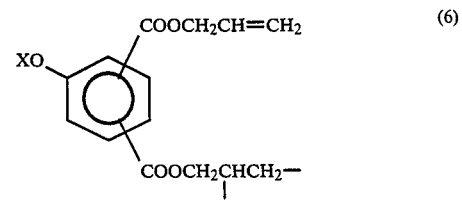

wherein X is prefluoroalkenyl group having 6 to 14 carbon atoms. Further, the present invention provides a curable resin composition which comprises a prepolymer having at least one carbon-carbon double bond in the molecule and diallyl aromatic fluorine-containing dicarboxylate represented by the formula

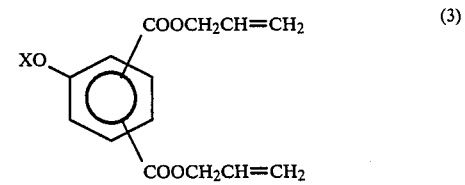

1 Claim, No Drawings

AROMATIC DICARBOXYLIC ACID DIALLYL ESTER DERIVATIVE, PREPOLYMER DERIVED FROM THE DERIVATIVE AND CURABLE RESIN COMPOSITION CONTAINING THE DERIVATIVE

The present invention relates to an aromatic dicarboxylic acid diallyl ester derivative, prepolymer derived from the derivative and curable resin composition containing the derivative.

It is known that a hexafluoropropene oligomer is reacted with 4-hydroxyphthalic acid or 5-hydroxyisophthalic acid to obtain a corresponding [perfluoroalkenyloxy](iso)phthàlic acid (Japanese Unexamined Patent Publication Nos. 140,951/1981 and 51,146/1985). Further, also is known a dialkyl ester of 4-perfluoroalkenyloxyphthalic acid (Japanese Unexamined Patent Publication No. 24,547/1986). However, these compounds have no double bond in the molecule and can not polymerize by itself or with other compounds having a double bond.

Diallyl aromatic dicarboxylic such as diallyl phthalate is a monomer having two polymerizable functional groups and is used for preparing a thermosetting resin. In a molding process for obtaining a desired molded article by polymerizing such a monomer having at least two polymerizable functional groups into a polymer, it is usually conducted to suspend the polymerization reaction to obtain a polymer having a solubility in solvent or thermoplasticity. The polymer is molded as in the form of a solution or a thermoplastic resin and then polymerized after molding or with molding at the same time to a cured resin which is not soluble in solvent or molten. In the above, the polymer having a solubility or thermoplasticity is called as a prepolymer.

A cured article of a conventional prepolymer such as diallyl phthalate is useful as a socket, connector and like electric parts, laminates, decorative sheets, etc., but has a defect of being poor in water-resistance.

Further, various curable resin compositions are conventionally known and are used for ink, varnish, coating composition, adhesive, FRP, molded article and the like. An epoxy acrylate resin is excellent in adhesion to various kinds of substrates but is inferior in water-resistance. Further, an unsaturated polyester has a defect of being insufficient in water-resistance.

An object of the invention is to provide a novel aromatic dicarboxylic acid diallyl ester derivative and process for preparing the same, the derivative has a double bond and can polymerize by itself or with other compounds having a double bond.

Another object of the invention is to provide a novel prepolymer derived from diallyl aromatic dicarboxylate which affords a cured product having an excellent water-resistance.

Still another object of the invention is to dissolve the above-mentioned defects and to provide a curable resin composition which hardens by heating or irradiation of active energy rays to give a cured article having an excellent water-resistance.

The present invention provides a diallyl aromatic dicarboxylate derivative of the formula

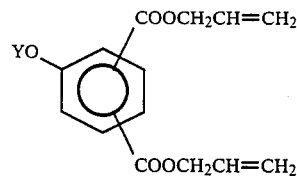 (1)

wherein Y is hydrogen atom or perfluoroalkenyl group having 6 to 14 carbon atoms.

The above diallyl aromatic dicarboxylate derivative includes all of isomers in which one 2-propenyloxycarbonyl group is bonded to ortho, meta or para position of the other 2-propenyloxycarbonyl group.

Examples of perfluoroalkenyl groups Y having 6 to 14 carbon atoms of the invention are the following groups of the formulae

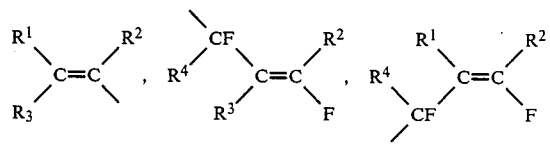

wherein $R^1$, $R^2$ and $R^3$ are each perfluoroalkyl group having 1 to 6 carbon atoms, or one of them is fluorine atom and the others are each perfluoroalkyl group having 1 to 6 carbon atoms, $R^4$ is perfluoroalkyl group having 1 to 5 carbon atoms. Especially preferable are groups formed by eliminating one fluorine atom from a dimer or trimer of hexafluoropropene, or tetramer, pentamer, hexamer or heptamer of tetrafluoroethylene. These groups are shown below by the formulae.

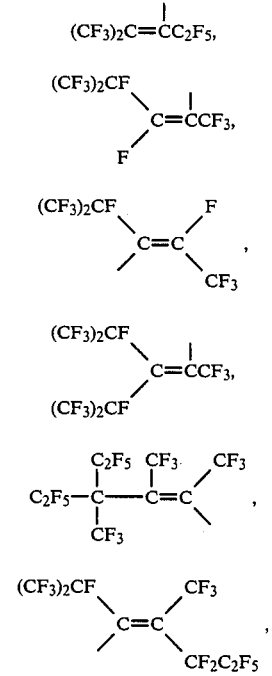

-continued

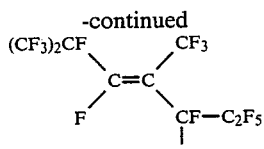

In the invention, the compound (3) of the formula

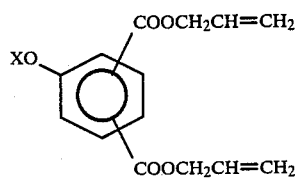    (3)

is novel and is prepared, for example, by reacting a perfluoroalkene XF with a hydroxy aromatic dicarboxylic acid derivative of the formula

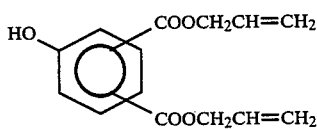    (2)

In the above, X is perfluoroalkenyl group having 6 to 14 carbon atoms.

The above compound (2) is novel and is obtained, for example, by esterifying hydroxyphthalic acid with allyl alcohol in the presence of a catalyst. In the reaction, allyl alcohol is used preferably in an amount of about 2 to 40 moles per mole of hydroxyphthalic acid. As a catalyst is used concentrated sulfuric acid, p-toluenesulfonic acid, boron trifluoride ethyl etherate, etc. The reaction temperature is preferably about 50° to 200° C., the reaction time is suitably determined and is generally about 30 minutes to 20 hours. The reaction pressure is not particularly limited. The reaction is conducted preferably in a solvent. As a solvent is preferably used one which make an azeotrope with water and is substantially immiscible with water. Examples thereof are benzene, toluene, xylene, diallyl ether, etc. The obtained compound (2) can be purified by a known method such as concentration, extraction, distillation, chromatography, etc. but can be reacted without purification with the perfluoroalkene XF in a next process.

Examples of perfluoroalkenes XF are the following compounds of the formula

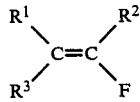    (5)

wherein $R^1$, $R^2$ and $R^3$ are each perfluoroalkyl group having 1 to 6 carbon atoms, or one of them is fluorine atom and the others are each perfluoroalkyl group having 1 to 6 carbon atoms. Especially preferable are a dimer or trimer of hexafluoropropene, or tetramer, pentamer, hexamer or heptamer of tetrafluoroethylene. These are shown below by the formulae.

-continued

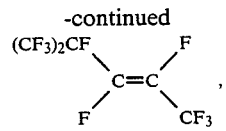

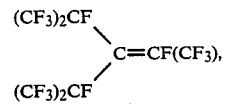

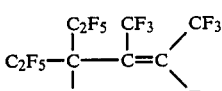

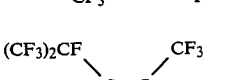

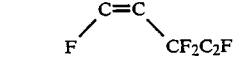

The reaction is conducted preferably in a solvent in the presence of a base. Examples of bases are triethylamine, trimethylamine, tripropylamine or like amines, alkali metal or hydroxides thereof, etc. As a solvent is used preferably an aprotic polar solvent such as acetonitrile, dimethyl formamide, dimethyl sulfoxide, etc. The perfluoroalkene is used preferably in an amount of about 1 to 10 moles per mole of the compound (2). The reaction temperature is suitably selected but is usually about 0° to 40° C., preferably about 0° to 20° C. The base is used preferably in an amount of about 2 to 20 moles per mole of the compound (2). The desired compound (3) can be separated and recovered by known methods used in the separation of a mixture of organic compounds containing solid dissolved in liquid. For example, the reaction mixture is added to a large amount of diluted hydrochloric acid and the resulting precipitates are collected and is distilled at a reduced pressure to obtain the desired compound.

The compounds XF of the formula (5) include compounds represented by the formulae below.

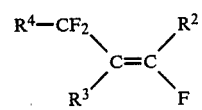

and

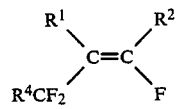

From the above compounds, the following groups are produced respectively.

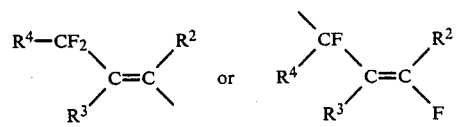

-continued

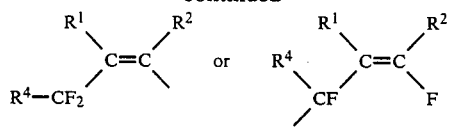

More specifically, from the compound

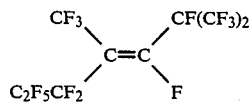

the following group is formed.

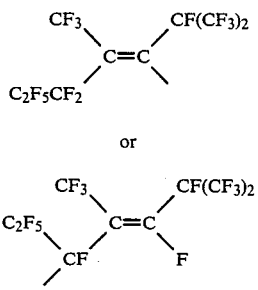

Further, the compound (1) can also be prepared by reacting an allyl alcohol with an aromatic dicarboxylic acid of the formula

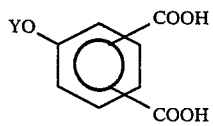

wherein Y is hydrogen atom or perfluoroalkenyl group having 6 to 14 carbon atoms. The compound (4) is a known compound. The reaction is conducted preferably in a solvent. As a solvent is preferably used one which make an azeotrope with water and is substantially immiscible with water. Examples thereof are benzene, toluene, xylene, diallyl ether, etc. Allyl alcohol is used preferably in an amount of about 2 to 10 moles per mole of the compound (4). The reaction temperature is suitably selected but is usually about 50° to 200° C., preferably about 70° to 160° C. The desired compound (1) can be separated and recovered by known methods used in the separation of a mixture of organic compounds containing solid dissolved in liquid. For example, the desired compound (1) can be recovered by concentration, distillation, gas chromatography, etc.

The compound (1) can be polymerized by heating in the presence of a peroxide such as benzoyl peroxide, thereby a polymer (prepolymer) having a double bond is prepared. The prepolymer can be cured to resin by heating or with irradiation of light, electron rays or like active energy rays and the cured product is excellent in water-resistance.

Thus, the present invention provides a prepolymer containing a repeating unit derived from diallyl aromatic fluorine-containing dicarboxylate and represented by the formula

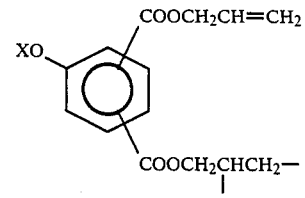

wherein X is perfluoroalkenyl group having 6 to 14 carbon atoms. Examples of X are same as described above.

In the invention, the repeating unit of the formula (6) is derived from diallyl fluorine-containing dicarboxylate which is a monomer of the above prepolymer and is represented by the formula

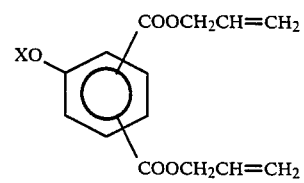

The compound (3) may convert, in some case, into a repeating unit of the formula

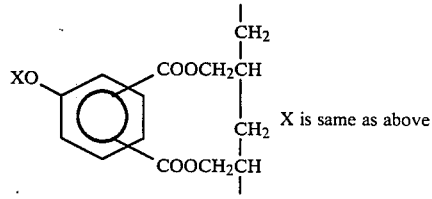

X is same as above and/or

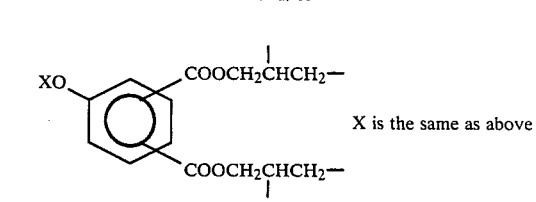

X is the same as above

In the present invention, it is probable to present a small amount of the above repeating unit(s).

The present prepolymer includes a copolymer having the repeating unit of the formula (6) and an other repeating unit.

Examples of other repeating units are those derived from cleavage of double bond of various compounds such as ethylene, vinyl acetate, vinyl fluoride, vinyl chloride, acrylamide, methacrylamide, styrene, α-methylstyrene, p-methylstyrene, alkyl ester of acrylic acid or methacrylic acid, benzyl (meth)acrylate, vinyl alkyl ether, halogenated alkyl vinyl ether, vinyl alkyl ketone, cyclohexyl (meth)acrylate, maleic anhydride, butadiene, isoprene, chloroprene, diallyl phthalate, diallyl isophthalate, diallyl terephthalate, etc.

The prepolymer has a molecular weight ($\overline{Mn}$) preferably of abot 1000 to 50000, more preferably about 3000 to 10000 and an iodine value (gram of iodine which adducts to 100 g of sample) preferably of about 10 to 95, more preferably about 25 to 80. With so great a molecular weight, the gelled polymer is hardly processed. With too small a molecular weight, the cured product does not have practical strength. The prepolymer having a too small iodine value can not afford a cured product having practical strength. A cured product having inferior impact-resistance is obtained from the prepolymer having a too large iodine value.

The prepolymer is prepared by polymerizing the compound (3) or copolymerizing it with other comonomer.

Examples of useful comonomers are various compounds such as ethylene, vinyl acetate, vinyl fluoride, vinyl chloride, acrylamide, methacrylamide, styrene, α-methylstyrene, p-methylstyrene, alkyl ester of acrylic acid or methacrylic acid, benzyl (meth)acrylate, vinyl alkyl ether, halogenated alkyl vinyl ether, vinyl alkyl ketone, cyclohexyl (meth)acrylate, maleic anhydride and like ethylenic compounds, butadiene, isoprene, chloroprene and like conjugated diene compounds, diallyl phthalate, diallyl isophthalate, diallyl terephthalate and like non-conjugated diene compounds, etc. The prepolymer contains the repeating unit (6) in an amount preferably of at least about one percent (weight percent, same as hereinafter), more preferably at least about 10%. With less than about one percent, water-resistance is not expected.

In the polymerization, methods and conditions thereof are suitably selected. For example, as radical polymerization are adopted bulk polymerization, solution polymerization, suspension polymerization, emulsion polymerization, etc. As ionic polymerization are conducted cationic polymerization, etc. As an initiator in radical polymerization is used a compound which produces free radicals. Preferred radical initiators are benzoyl peroxide, tert-butyl perbenzoate, acetyl benzoyl peroxide, succinyl peroxide, diisopropyl peroxydicarbonate, ammonium persulfate and like peroxides, azobisisobutyronitrile and like azonitriles, etc. Further, it is possible to use a chain transfer agent which is disclosed in Japanese Examined Patent Publication No. 16,035/1960 and has the formula

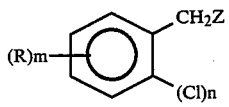

wherein Z is Cl, OH or group convertible to OH, R is lower alkyl (1 to 4 carbon atoms), m is 0 to 4, n is 0 to (4-m). The chain transfer agent is used in an amount of preferably about 10 to 25% by weight in order to adjust the molecular weight and to prevent the gelation. For the same purpose are adjusted amount of initiator, polymerization temperature, polymerization time, etc. The radical initiator is used in an amount of 0.1 to 10% by weight based on the weight of monomers. However, the amount of initiator is not limited thereabove and is suitably selected depending on polymerization degree of the desired polymer, polymerization time, polymerization temperature, etc. The polymerization temperature is usually $-80°C$ to $+250°C$ as depending on the decomposition temperature of the initiator. Generally, the temperature is preferably in the range of $-40°C$ to $+150°C$. Solvents useful for solution polymerization are benzene, toluene, xylene and like aromatic hydrocarbons, chloroform, methylene chloride, ethylene chloride and like low-basic solvents. These solvents are used singly or in mixture. The cationic polymerization is preferably conducted in a solvent such as toluene, benzene, etc. at $-30°C$ to $+250°C$ in the presence of boron trifluoride ethyl etherate, aluminum chloride or like initiator.

The polymer is separated from the reaction mixture by a usual method, for example, by adding the mixture to a poor solvent which does not dissolve the polymer such as methanol, diisopropyl ether, dimethyl ether, petroleum ether or n-hexane. The polymer is obtained as precipitates. The precipitated polymer is purified by dissolving it in a solvent which is capable of dissolving the polymer such as acetone, methyl ethyl ketone, ethyl acetate, dioxane, tetrahydrofuran, ethylene dichloride, chloroform, carbon tetrachloride, trichloroethylene, benzene, toluene, etc. and thereafter re-precipitating the polymer by adding the solution in a poor solvent.

The present prepolymer can be cured by itself or in the form of a mixture thereof with a prepolymer of diallyl phthalate, diallyl isophthalate, diallyl tetraphthalate, etc. The curing is conducted by heating or light in the presence of thermal polymerization initiator, photopolymerization initiator, etc. or with irradiation of electron rays, gamma-ray or like active energy rays in the absence of the initiator. In case of using the initiator, as a carrier for initiator is used diallyl phthalate, diallyl isophthalate, diallyl terephthalate or like monomer. The carrier is used preferably up to about 90% by weight of the mixture.

Examples of thermal polymerization initiators are methyl ethyl ketone peroxide, cyclohexanone peroxide and like ketone peroxides, t-butyl perbenzoate, t-butyl peroxy-2-ethylhexoate and like peresters, t-butyl hydroperoxide, cumene hydroperoxide and like hydroperoxides, benzoyl peroxide and like diacyl peroxides. The photopolymerizaton initiators include 2,2-diethoxyacetophenone, 2,2-dimethoxy-2-phenylacetophenone and like benzoin alkyl ethers, diethoxyacetophenone and like acetophenones, benzophenone and like ketones, 2-chlorothioxanthone and like thioxanthones, etc. The initiator is used preferably in an amount of about 0.001 to 20% by weight, more preferably about 0.1 to 10% by weight based on the total amount of the prepolymer and carrier.

The curing is conducted used at a temperature from room temperature to 250° C., preferably from room temperature to 180° C., despite that any of heat, light or active energy rays is used.

The compound (3) which is diallyl aromatic fluorine-containing dicarboxylate is mixed with a prepolymer having at least one carbon-carbon double bond in the molecule to form a curable resin composition.

The followings are examples of useful prepolymers having at least one double bond in the molecule, although not limited thereto.

(i) Polyester obtained by using an unsaturated polybasic carboxylic acid or polyester using an unsaturated polyol These polyesters are prepared by the condensation of a polybasic carboxylic acid and polyol in which a part or all of at least one component is an unsaturated polybasic carboxylic acid or unsaturated polyol.

Polybasic carboxylic acids include an unsaturated polybasic carboxylic acid and saturated polybasic carboxylic acid. Examples of the former are maleic anhydride, fumaric acid, citraconic acid, itaconic acid, etc.

The latter includes phthalic anhydride, isophthalic acid, terephthalic acid, adipic acid, azelaic acid, sebacic acid, dodecane dicarboxylic acid, etc. The detail of carboxylic acids are described in "High Polymer Data Handbook, fundamental edition, p 259~275 (Dicarboxylic acids)", published by Baihukan, Tokyo, Jan. 30, 1986.

Polyols include a saturated polyol and unsaturated polyol. The former includes ethylene glycol, propylene glycol and like alkanediol having 2 to 8 carbon atoms. Examples of the latter are butenediol, 3,4-dihydroxy-1,5-hexadiene, pentaerythritol diallyl ether, etc. The detail of polyols are shown in the above "High Polymer Data Handbook, fundamental edition, p 283~322 (Diols and polyols)".

Generally, the polyester is a condensation product of an unsaturated polybasic carboxylic acid or a mixture thereof with a saturated polybasic carboxylic acid, and a saturated polyol.

(ii) Polyester using an unsaturated monocarboxylic acid

The polyester is a condensation product of an unsaturated monocarboxylic acid, polybasic carboxylic acid and polyol.

The unsaturated monocarboxylic acids include acrylic acid, methacrylic acid, crotonic acid, cinnamic acid, half-ester of an unsaturated dicarboxylic acid such as monoalkyl ($C_{1\sim 8}$) ester of maleic acid, monoalkyl ($C_{1\sim 8}$) ester of fumaric acid, monoalkyl ($C_{1\sim 8}$) ester of itaconic acid, etc.

As a polybasic carboxylic acid and polyol, same compounds are used as mentioned in (i).

Generally, the polyester is a condensation product of an unsaturated monocarboxylic acid, saturated polybasic carboxylic acid and saturated polyol.

(iii) Adduct of a polyepoxy compound and unsaturated monocarboxylic acid

Polyepoxy compounds include polyepoxy-hydrocarbon, polyepoxy-halogenohydrocarbon, polyepoxy-alcohol, polyepoxy-aldehyde, polyepoxy-carboxylic acid, etc. Polyepoxy compounds may be either saturated or unsaturated compounds and include a polymer, i.e., epoxy resin, as far as at least two epoxy groups are contained in the molecule. Examples of polyepoxy compounds are bisphenol A-diglycidyl ether, neopentyl glycol diglycidyl ether, vinylcyclohexene diepoxide, epoxidized soybean oil, etc. As unsaturated monocarboxylic acids, same compounds are used as mentioned in (ii).

(iv) Polyetherpolyol unsaturated monocarboxylic acid ester

The ester is an ester of an adduct of polyol and alkylene oxide (polyetherpolyol), and unsaturated monocarboxylic acid.

Alkylene oxides include ethylene oxide, propylene oxide and like alkylene oxides having 2 to 8 carbon atoms, or those in which a part of hydrogen atom is substituted with a halogen atom such as chlorine atom, etc.

As polyols and unsaturated monocarboxylic acids, the same compounds are used as mentioned in (i) and (ii).

(v) Unsaturated polyurethane

The unsaturated polyurethane is an adduct of a partial ester of a polyol and unsaturated monocarboxylic acid, and a soluble or meltable compound having a free isocyanate group (containing a linear or branched structure but no network structure). Examples of compounds having a free isocyanate group are a polyisocyanate and adduct of polyisocyanate to polyol and/or polyetherpolyol.

Polyisocyanates include tolylenediisocyanate, dimethylenebenzenediisocyanate, diphenylmethanediisocyanate, hexahydrotolylenediisocyanate, dimethylenecyclohexanediisocyanate, dicyclohexylmethanediisocyanate, hexamethylenediisocyanate, isophoronediisocyanate, triphenylmethanetriisocyanate, compounds of the formulae

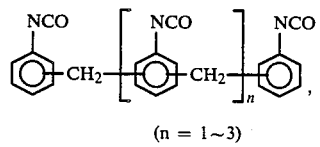

(n = 1~3)

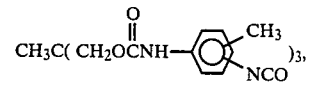

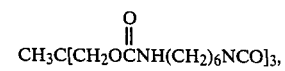

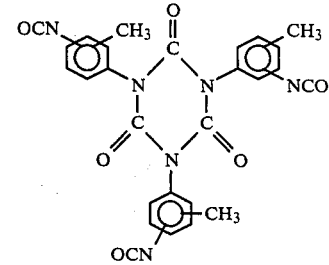

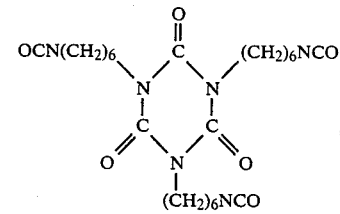

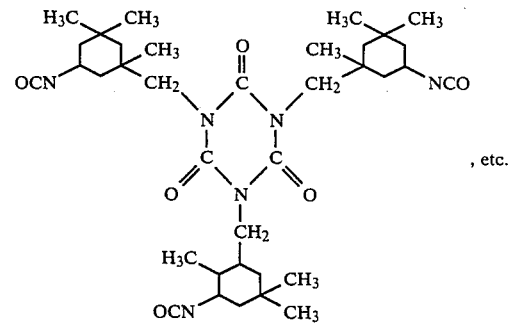

, etc.

As polyols are used same compounds as mentioned in (i) and as polyetherpolyols are employed same compounds as stated in (iv).

As partial esters of a polyol and unsaturated monocarboxylic acid are listed 2-hydroxyethyl(meth)acrylate, trimethylolpropane di(meth)acrylate, glycerine di(meth)acrylate, etc.

These compounds (i)~(v) can be used singly or in mixture of at least two of them.

In the present composition, the compound (3) is used preferably in an amount of about 1 to 99% (weight %, same as hereinafter), more preferably about 20 to 60%.

In the curing of the above resin composition of the invention, ethylenically unsaturated compounds can be used, when required, as a reactive diluent. The ethylenically unsaturated compounds include various known compounds and typical examples thereof are styrene, vinyltoluene, chlorostyrene, t-butylstyrene, α-methylstyrene, divinylbenzene, acrylic acid, methacrylic acid, methyl, ethyl, isopropyl, n-buthyl, t-butyl, α-ethylhexyl, n-nonyl, n-decyl, lauryl or stearyl ester of acrylic acid or methacrylic acid, n-butoxyethyl, cyclohexyl, phenoxyethyl, tetrahydrofurfuryl, glycidyl, allyl, benzyl, tribromophenyl, 2,3-dichloropropyl, 3-chloro-2-hydroxypropyl ester of acrylic acid or methacrylic acid, ethylene glycol mono(meth)acrylate, propylene glycol mono(meth)acrylate, diethylene glycol mono(meth)acrylate, dipropylene glycol mono(meth)acrylate, polyethylene glycol [Molecular weight (MW), 200~1000] mono(meth)acrylate, polyethylene glycol (MW, 200~1000) monomethyl ether mono(meth)acrylate, polypropylene glycol (MW, 200~1000) mono(meth)acrylate, polypropylene glycol (MW, 200~1000) monomethyl ether mono(meth)acrylate, polyethylene glycol (MW, 200~1000) monoethyl ether mono(meth)acrylate, polypropylene glycol (MW, 200~1000) monoethyl ether mono(meth) acrylate, ethylene glycol di(meth)acrylate, propylene glycol di(meth)acrylate, 1,3-propanediol di(meth)acrylate, 1,4-butanediol di(meth)acrylate, neopentyl glycol di(meth)acrylate, 1,6-hexanediol di(meth)acrylate, polyethylene glycol di(meth)acrylate, polypropylene glycol di(meth)acrylate, glycerin di(meth)acrylate, glycerin tri(meth)acrylate, trimethylolethane di(meth)acrylate, trimethylolethane tri(meth)acrylate, trimethylolpropane tri(meth)acrylate, diallyl phthalate, dibutyl fumarate, vinyl acetate, etc. The reactive diluent is used preferably in an amount of about 1 to 95% by weight, more preferably about 5 to 80% by weight based on the total weight of the reactive diluent and the prepolymer.

In order to preserve the present composition in stable state, a known polymerization inhibitor can be added thereto. The amount thereof is 0.001 to 2.5% by weight, preferably 0.005 to 1% by weight based on the total weight of the composition. Further, a coloring agent, dispersant and like conventional additives can be, as required, added to the present composition.

The present composition can be obtained by mixing the above ingredients by a known method, for example, by use of a mixer, roll mill, ball mill, sand mill, high-speed impeller, etc.

The prepolymer of the present invention having at least one double bond in the molecule can be cured by a known method, for example, by heating or with irradiation of ultraviolet rays, electron rays, X-rays, gamma-ray and like active energy rays.

In case of using the above electron rays, X-rays, gamma-ray or like ionized radioactive ray having high energy and releasing secondary electrons having absorbed in a substance, it is not necessary to use a polymerization initiator. However, in case the composition is cured by heating or with irradiation of ultraviolet rays, it is preferable to use a thermal polymerization initiator or photopolymerization initiator.

Examples of thermal polymerization initiators are methyl ethyl ketone peroxide, cyclohexanone peroxide and like ketone peroxides, t-butyl perbenzoate, t-butyl peroxy-2-ethylhexoate and like peresters, t-butyl hydroperoxide, cumene hydroperoxide and like hydroperoxides, benzoyl peroxide and like diacyl peroxides. The photopolymerization initiators include 2,2-diethoxyacetophenone, 2,2-dimethoxy-2-phenylacetophenone and like benzoin alkyl ethers, diethoxyacetophenone and like acetophenones, benzophenone and like ketones, 2-chlorothioxanthone and like thioxanthones, etc. The initiator is used preferably in an amount of about 0.001 to 20% by weight, more preferably about 0.1 to 10% by weight based on the total amount of the prepolymer and reactive diluent.

The curing is conducted usually at a temperature from room temperature to 250° C., preferably from room temperature to 180° C., despite that any of heat, light or active energy rays is used.

The compound (1) is useful as a starting material for a prepolymer and cured product. For example, a homoprepolymer or coprepolymer of the compound (1) is employed for the preparation of a fiber reinforced plastic, glass cloth prepreg, etc.

The prepolymer contains a side chain which has a carbon-carbon double bond in the terminal, exhibits cross-linking ability and affords a cured product. Further, the prepolymer has a perfluoroalkenyloxy chain as the other side chain which gives an excellent water-resistance to the cured product. The cured product obtained from the present prepolymer has water-resistance which is much superior to that of a cured product prepared from the conventional diallyl phthalate. Even the prepolymer containing about 50% by weight of the repeating unit (6) provides a curing product which is about 1/10 in water absorbency as compared to the conventional product.

The invention will be described below with reference to Examples and Comparison Examples in which parts are all by weight, unless otherwise specified.

EXAMPLE 1

Into a reaction vessel equipped with a stirrer, condenser and thermometer was placed 0.2 mole of 5-hydroxyisophthalic acid. Thereto were added 0.6 mole of allyl alcohol, 300 ml of toluene, 1.3 g of sulfuric acid and 0.2 g of p-methoxyphenol and the mixture was refluxed with heating. A mixture of toluene and water was distilled off and cooled with a condenser, and toluene was separated from water and returned continuously to the reaction vessel. The mixture was heated for 8 hours and then allowed to cool. At this point, total of distilled water was 7 ml. After the reaction mixture was washed with a saturated aqueous solution of sodium chloride until the aqueous layer did not indicate acidic, toluene was distilled at a reduced pressure. The resulting concentrate was distilled at a reduced pressure to obtain 27 g (yield 52%) of diallyl 5-hydroxy-isophthalate. b.p. 202°~205° C./5 mmHg.

$^1$H-NMR (TMS standard, in acetone-$d_6$, δppm)

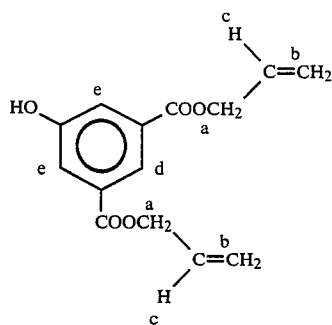

a 4.8~4.9, m, 4H
b 5.2~5.5, m, 4H
c 5.8~6.3, m, 2H
e 7.6, d, 2H
d 8.0, s, 1H

The obtained diallyl 5-hydroxy-isophthalate (26 g) was dissolved in 90 ml of dimethylformamide and thereto was added 31 g of triethylamine. To the mixture was added dropwise 45 g of hexafluoropropene trimer with stirring at room temperature in a period of 10 minutes. The mixture was further stirred for 2 hours and then poured into a large amount of a diluted aqueous solution of hydrochloric acid to obtain oily precipitates. The precipitates were separated, washed with water and distilled at a reduced pressure to give 41 g (yield 59%) of diallyl 5-(perfluorononenyloxy)isophthalate (Compound A). b.p. 150°~152° C./4 mmHg.

$^{19}$F-NMR (external standard CF$_3$COOH, in CDCl$_3$)

Chemical shift (δppm) is shown in which high magnetic field is indicated by a plus value.

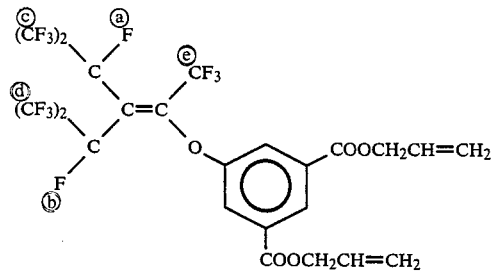

ⓐ +88.5, 1F
ⓑ +90.4, 1F
ⓒ −6.4, 6F
ⓓ −7.6, 6F
ⓔ −23.0, 3F

EXAMPLE 2

The reaction was conducted in the same manner as in Example 1 except that 4-hydroxy-phthalic acid was used in place of 5-hydroxy-isophthalic acid to obtain diallyl 4-(perfluorononenyloxy)phthalate (Compound B). b.p. 160°~162° C./7 mmHg.

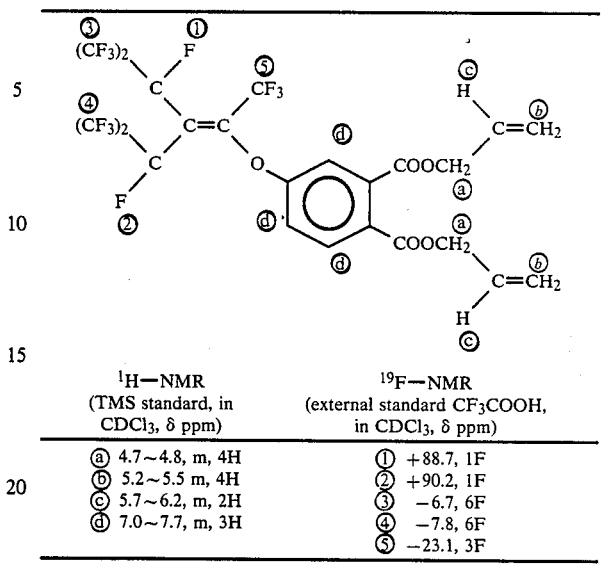

| $^1$H—NMR (TMS standard, in CDCl$_3$, δ ppm) | $^{19}$F—NMR (external standard CF$_3$COOH, in CDCl$_3$, δ ppm) |
|---|---|
| ⓐ 4.7~4.8, m, 4H | ① +88.7, 1F |
| ⓑ 5.2~5.5 m, 4H | ② +90.2, 1F |
| ⓒ 5.7~6.2, m, 2H | ③ −6.7, 6F |
| ⓓ 7.0~7.7, m, 3H | ④ −7.8, 6F |
| | ⑤ −23.1, 3F |

EXAMPLE 3

The reaction was conducted in the same manner as in Example 1 except that 30 g of hexafluoropropene dimer was used in place of the trimer thereof and the reaction with diallyl 5-hydroxy-isophthalate was conducted at 0° to 4° C. to obtain 39 g of diallyl 5-(perfluorohexenyloxy)isophthalate (Compound C). b.p. 128°~131° C./5 mmHg.

$^{19}$F-NMR (external standard CF$_3$COOH, in CDCl$_3$, δppm)

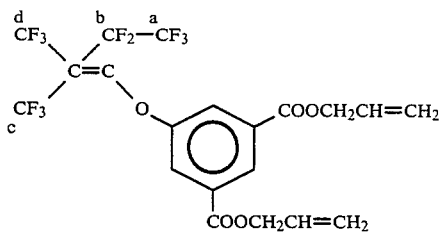

a +4.3, m, 3F
b +34.5, m, 2F
c −18.2, m, 3F
d −21.3, s, 3F

EXAMPLE 4

The reaction was conducted in the same manner as in Example 2 except that 50 g of tetrafluoroethylene pentamer was used in place of hexafluoropropene trimer to obtain diallyl 4-(perfluorodecenyloxy)phthalate (Compound D). b.p. 165°~167° C./6 mmHg.

EXAMPLE 5

Into a vessel equipped with a stirrer and condenser were placed Compound A (250 g), diallyl terephthalate (250 g), benzoyl peroxide (7 g), dibutyltin dilaurate (6 g) and water (250 g), and the mixture was reacted at 85° C. for 5 hours. After completion of the reaction, the mixture was cooled to room temperature and acetone (50 g) was added thereto. The organic layer was added dropwise to a large amount of methanol with stirring. The resulting precipitates were filtered, washed with methanol, dried at a reduced pressure and pulverized to obtain 120 g of white powder. The powder was 66 in iodine value, $8.6 \times 10^3$ in number average molecular weight ($\overline{Mn}$), $5.3 \times 10^4$ in weight average molecular weight ($\overline{Mw}$) in term of polystyrene with use of gel permeation chromatography and 18.5 wt% in fluorine content. Accordingly, the above white powder was a prepolymer in which Compound A and diallyl terephthalate were contained in molar ratio of 1:4.3. To a solution of the prepolymer (50 parts) and diallyl terephthalate (50 parts) was added benzoyl peroxide (2 parts). The mixture was poured into a Petri dish having internal diameter of 50 mm and heated at 90° C. for 8 hours to obtain a casting plate which was 50 mm in diameter and 3 mm in thickness.

EXAMPLE 6

White powder (102 g) was obtained in the same manner as in Example 5 except that Compound B (250 g) was used as diallyl aromatic fluorine-containing dicarboxylate and the reaction was conducted for 4 hours. The powder was 70 in iodine value, $7.3 \times 10^3$ in $\overline{Mn}$, $4.4 \times 10^4$ in $\overline{Mw}$ and 18.6 wt% in fluorine content. Accordingly, the above white powder was a prepolymer in which Compound B and diallyl terephalate were contained in molar ratio of 1:4.3. A casting plate was obtained in the same manner as in Example 5 with use of the prepolymer.

EXAMPLE 7

White powder (148 g) was obtained in the same manner as in Example 6 except that Compound B (375 g) and diallyl terephthalate (125 g) were used. The powder was 49 in iodine value, $1.1 \times 10^4$ in $\overline{Mn}$, $4.6 \times 10^5$ in $\overline{Mw}$ and 31.4 wt% in fluorine content. Accordingly, the above white powder was a prepolymer in which Compound B and diallyl terephthalate were contained in molar ratio of 1:1.4. A casting plate was obtained in the same manner as in Example 5 with use of the prepolymer.

EXAMPLE 8

White powder (118 g) was obtained in the same manner as in Example 5 except that diallyl phthalate (125 g) and diallyl isophthalate (125 g) were used in place of diallyl terephthalate. The powder was 65 in iodine value, $7.2 \times 10^3$ in $\overline{Mn}$, $4.2 \times 10^4$ in $\overline{Mw}$ and 18.7 wt% in fluorine content. Accordingly, the above white powder was a prepolymer in which Compound A and diallyl esters were contained in molar ratio of 1:4.3. A casting plate was obtained in the same manner as in Example 5 with use of the prepolymer.

EXAMPLE 9

White powder (121 g) was obtained in the same manner as in Example 5 except that diallyl isophthalate was used in place of diallyl terephthalate. The powder was 72 in iodine value, $5.6 \times 10^3$ in $\overline{Mn}$, $6.1 \times 10^4$ in $\overline{Mw}$ and 18.5 wt% in fluorine content. Accordingly, the above white powder was a prepolymer in which Compound A and diallyl isophthalate were contained in molar ratio of 1:4.3. A casting plate was obtained in the same manner as in Example 5 with use of the prepolymer.

EXAMPLE 10

A prepolymer (87 g) of Compound B only was prepared in the same manner as in Example 6 except that Compound B was used as a sole component of aromatic dicarboxylate without use of diallyl terephthalate. The powder was 28 in iodine value, $2.4 \times 10^3$ in $\overline{Mn}$, $4.8 \times 10^3$ in $\overline{Mw}$ and 45.9 wt% in fluorine content. The prepolymer (50 parts) and Compound B (50 parts) were mixed homogeneously with heating and benzoyl peroxide (2 parts) was added thereto. The mixture was heated at 90° C. for 8 hours to obtain a casting plate.

EXAMPLE 11

White powder (108 g) was obtained in the same manner as in Example 5 with use of Compound C (300 g), diallyl terephathalate (200 g), benzoyl peroxide (7 g), dibutyltin dilaurate (6 g) and water (250 g). The powder was 71 in iodine value, $9.2 \times 10^3$ in $\overline{Mn}$, $5.9 \times 10^4$ in $\overline{Mw}$ and 19.8 wt% in fluorine content. Accordingly, the above white powder was a prepolymer in which Compound C and diallyl terephthalate were contained in molar ratio of 1:2.1. The prepolymer (60 parts) and diallyl terephthalate (40 parts) were mixed and benzoyl peroxide (2 parts) was added thereto. A casting plate was prepared in the same manner as in Example 5 with use of the mixture.

EXAMPLE 12

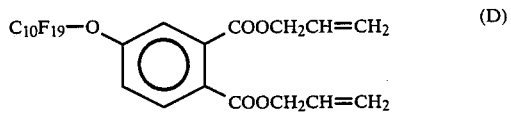

In Compound D, perfluoroalkenyloxy group X is derived from pentamer of tetrafluoroethylene. A prepolymer (107 g) of Compound D only was prepared in the same manner as in Example 10 except that Compound D (500 g) was used and the reaction was conducted for 6 hours. The powder was 26 in iodine value, $3.2 \times 10^3$ in $\overline{Mn}$, $6.7 \times 10^3$ in $\overline{Mw}$ and 48.5 wt% in fluorine content. The prepolymer (70 parts) and Compound D (30 parts) were mixed homogeneously with heating and benzoyl peroxide (2 parts) was added thereto. A casting plate was prepared in the same manner as in Example 5 with use of the mixture.

COMPARISON EXAMPLE 1

Into diallyl terephthalate (50 parts) was dissolved 50 parts of diallyl phthalate prepolymer [trade name, DAISO DAP A, Osaka Soda Co., Ltd., $\overline{Mn}=6.7 \times 10^3$, $\overline{Mn}=2.6 \times 10^4$, iodine value 61] and benzoyl peroxide (2 parts) was added thereto. A casting plate was prepared in the same manner as in Example 5 with use of the mixture.

COMPARISON EXAMPLE 2

A casting plate was prepared in the same manner as in Comparison Example 1 except that diallyl terephthalate polymer [trade name, DAPREN, Osaka Soda Co., Ltd., $\overline{Mn}=7.3 \times 10^3$, $\overline{Mw}=2.5 \times 10^5$, iodine value 51] was used in place of DAISO DAP A.

Casting plates prepared in Examples 5 to 12 and Comparison Examples 1 and 2 were checked for water absorbency at 23° C. according to JIS K-6911. The results were given in Table 1.

TABLE 1

|  | Water absorbency (wt. %) |
|---|---|
| Ex. 5 | 0.03 |

TABLE 1-continued

|  | Water absorbency (wt. %) |
|---|---|
| Ex. 6 | 0.03 |
| Ex. 7 | 0.01 |
| Ex. 8 | 0.04 |
| Ex. 9 | 0.03 |
| Ex. 10 | <0.01 |
| Ex. 11 | 0.04 |
| Ex. 12 | <0.01 |
| Com. Ex. 1 | 0.33 |
| Com. Ex. 2 | 0.41 |

EXAMPLE 13

A ultraviolet-ray curable resin composition (I) was prepared according to the following formulation.

| *Oligoester acrylate (trade name, ARONIX M-6420 X, viscosity 4 × 10⁴cps/50° C. Toagosei Chemical Industry Co., Ltd.) | 50 |
|---|---|
| *Compound (A) | 35 |
| *Trimethylolpropane triacrylate | 5 |
| *2-Hydroxyethyl acrylate | 3 |
| *Methyl o-benzoylbenzoate | 5 |
| *Diethylaminoethyl methacrylate | 2 |
|  | 100 parts |

Composition (I) was applied by a bar coater to a glass plate in a thickness of 20 μm and the coating film was cured sufficiently to subjecting the film to pass under a high-voltage merury lamp (80 W/cm) three times, the film being placed on a conveyor moving at 5 m/min.

EXAMPLE 14

A ultraviolet-ray curable resin composition (II) was prepared according to the following formulation.

| *Unsaturated epoxy resin (trade name Diclite UE-8200, Dainippon Ink & Chemicals Inc.) | 50 |
|---|---|
| *Compound (B) | 30 |
| *1,6-Hexanediol diacrylate | 10 |
| *2-Hydroxyethylacryloyl phosphate | 3 |
| *Methyl o-benzoylbenzoate | 5 |
| *Triethanolamine | 2 |
|  | 100 parts |

Composition (II) was applied by a bar coater to a degreased soft steel plate in a thickness of 20 μm and the coating film was cured in the same manner as in Example 13.

EXAMPLE 15

A thermosetting resin composition (III) was prepared according to the following formulation.

| *Maleic acid-propylene glycol type unsaturated polyester resin (acid value 18.5 mgKOH/g) | 40 |
|---|---|
| *Compound (C) | 35 |
| *Styrene | 20 |
| *Methyl ethyl ketone peroxide | 3 |
| *Dimethylaniline (0.5% solution) | 1 |
| *Cobalt naphthenate (Co content 5%) | 1 |
|  | 100 parts |

Composition (III) was applied by a bar coater to a degreased soft steel plate in a thickness of 100 μm and the coating film was allowed to stand in a desiccator at 30° C. for 10 hours, the air in the desiccator being replaced by nitrogen preveously.

EXAMPLE 16

| *Urethane acrylate (trade name, ARONIX M-1100, viscosity 8 ~ 12 × 10⁴cps/50° C., Toagosei Chemical Industry Co., Ltd.) | 45 |
|---|---|
| *Compound (A) | 25 |
| *Trimethylolpropane triacrylate | 20 |
| *2-Hydroxyethylacryloyl phosphate | 3 |
| *Methyl o-benzoylbenzoate | 5 |
| *Triethanolamine | 2 |
|  | 100 parts |

A ultraviolet-ray curable resin composition (IV) was prepared according to the above formulation and a coating film was cured in the same manner as in Example 13.

EXAMPLE 17

| *Polyether acrylate (trade name, ARONIX M-220, viscosity 10~20cps/25° C., Toagosei Chemical Industry Co., Ltd.) | 30 |
|---|---|
| *Compound (B) | 50 |
| *Trimethylolpropane triacrylate | 13 |
| *Methyl o-benzoylbenzoate | 5 |
| *Diethylaminoethyl methacrylate | 2 |
|  | 100 parts |

A ultraviolet-ray curable resin composition (V) was prepared according to the above formulation and the composition (V) was applied by a bar coater to a glass plate in a thickness of 20 μm, and the coating film was cured in the same manner as in Example 13.

COMPARISON EXAMPLE 3

The procedure was conducted in the same manner as in Example 13 except that diallyl isophthalate was used in place of Compound (A).

COMPARISON EXAMPLE 4

The procedure was conducted in the same manner as in Example 14 except that diallyl phthalate was used in place of Compound (B).

COMPARISON EXAMPLE 5

The procedure was conducted in the same manner as in Example 15 except that diallyl isophthalate was used in place of Compound (C).

COMPARISON EXAMPLE 6

The procedure was conducted in the same manner as in Example 16 except that diallyl isophthalate was used in place of Compound (A).

COMPARISON EXAMPLE 7

The procedure was conducted in the same manner as in Example 17 except that diallyl isophthalate was used in place of Compound (B).

EXAMPLE 18

A ultraviolet-ray curable resin composition (VI) was prepared according to the following formulation and a coating film was cured in the same manner as in Example 13.

| *Polyethylene glycol diacrylate | 40 |
|---|---|

| | |
|---|---|
| *Urethane acrylate | 40 |

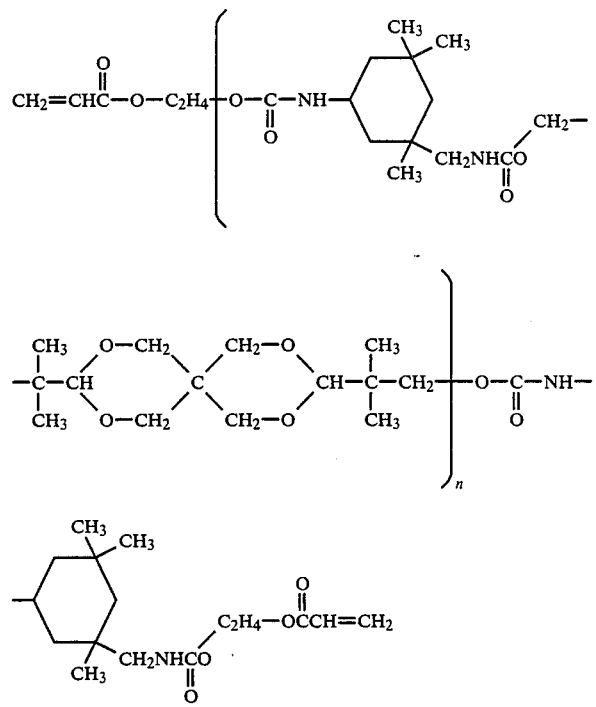

(n is 1, 2 and 3, average therof is 2)

| | |
|---|---|
| *Compound (A) | 20 |
| *Trimethylolpropane triacrylate | 15 |
| *Tetrahydrofurfuryl acrylate | 20 |
| *Benzyl dimethyl ketal | 5 |
| | 100 parts |

| | |
|---|---|
| (average molecular weight: 510) | |
| *Compound (A) | 20 |
| *Trimethylolpropane triacrylate | 30 |
| *Methyl o-benzoylbenzoate | 6 |
| *Diethylaminoethyl methacrylate | 4 |
| | 100 parts |

EXAMPLE 19

A mixture of one mole of maleic anhydride, one mole of phthalic anhydride and 2.16 moles of diethylene glycol was heated to 150° C. in a period of one hour under nitrogen atmosphere and then was maintained at the same temperature for 2 hours. Then the mixture was heated at 190° C. for 3 hours. As a residue was obtained an unsaturated polyester having an acid value of 55.7 mg KOH/g and hydroxyl value of 84.9 mg KOH/g. A thermosetting resin composition (VII) and a cured product thereof were obtained in the same manner as in Example 15 except that the above unsaturated polyester was used in place of the polyester of Example 15.

EXAMPLE 20

A ultraviolet-ray curable resin composition (VIII) was prepared according to the following formulation and a coating film was cured in the same manner as in Example 13.

EXAMPLE 21

A ultraviolet-ray curable resin composition (IX) was prepared in the same manner as in Example 13 except that 50 parts of the oligoester acrylate having the formula below [trade name, Viscoat #3700, Osaka Organic Chemical Ind. Co., Ltd.] was used in place of the oligoester acrylate of Example 13. A coating film was cured in the same manner as in Example 13.

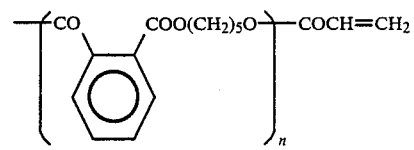

EXAMPLE 22

A ultraviolet-ray curable resin composition (X) was prepared according to the following formulation and a coating film was cured in the same manner as in Example 14.

| | |
|---|---|
| *Epoxy acrylate (trade name, Viscoat #540, Osaka Organic Chemical Ind. Co., Ltd.) | 40 |

-continued

CH$_2$=CHCOOCH$_2$CH(OH)CH$_2$—

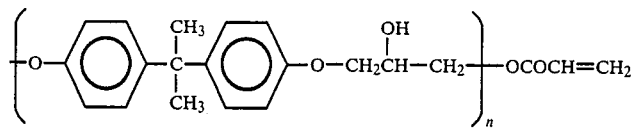

(viscosity: 2 × 10$^4$ cps/50° C.)

| | |
|---|---|
| *Compound (B) | 30 |
| *1,6-Hexanediol diacrylate | 20 |
| *2-Hydroxyethylacryloyl phosphate | 3 |
| *Methyl o-benzoylbenzoate | 5 |
| *Triethanolamine | 2 |
| | 100 parts |

Adhesion and water-resistance tests

Curable resin compositions were checked for adhesiveness to a substrate before boiling in water according to the following cross-out peeling test and were checked for water-resistance by observing an appearance of a coating after boiling in water. The results were given in Table 2. The present invention showed excellent effects in which the water-resistance was improved by using the compound (3).

Adhesion:

Adhesiveness was checked by cross-cut peeling test. The coating was cross-cut to the surface of the substrate in 100 pieces each 1×1 mm. A cellophane tape was adhered to the cross-cut portion and then peeled off quickly and the remained pieces were counted. Number of the remained pieces was shown.

Water-resistance:

Appearance of the coating after immersed in boiling water was shown.

◯ No change
Δ Coating was partially whited and swollen
X Coating was peeled off from the substrate

TABLE 2

| | Adhesiveness (number of remained pieces) | Water-resistance |
|---|---|---|
| Ex. 13 | 100 | ◯ |
| 14 | 100 | ◯ |
| 15 | 100 | ◯ |
| 16 | 100 | ◯ |
| 17 | 100 | ◯ |
| 18 | 100 | ◯ |
| 19 | 100 | ◯ |
| 20 | 100 | ◯ |
| 21 | 100 | ◯ |
| 22 | 100 | ◯ |
| Com. Ex. 3 | 100 | Δ |
| 4 | 100 | Δ |
| 5 | 100 | Δ |
| 6 | 100 | Δ |
| 7 | 100 | X |

We claim:

1. A diallyl aromatic dicarboxylate derivative of the formula

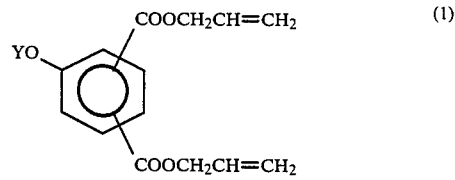

wherein Y is a perfluoroalkenyl group having 6 to 14 carbon atoms.

* * * * *